US008996431B2

(12) United States Patent
Cruz-Albrecht et al.

(10) Patent No.: US 8,996,431 B2
(45) Date of Patent: Mar. 31, 2015

(54) SPIKE DOMAIN NEURON CIRCUIT WITH PROGRAMMABLE KINETIC DYNAMIC, HOMEOSTATIC PLASTICITY AND AXONAL DELAYS (71) Applicant: HRL Laboratories, LLC, Malibu, CA (US)

(72) Inventors: Jose Cruz-Albrecht, Oak Park, CA (US); Michael W. Yung, Los Angeles, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 308 days.

(21) Appl. No.: 13/679,727

(22) Filed: Nov. 16, 2012

(65) Prior Publication Data
US 2014/0032460 A1 Jan. 30, 2014

Related U.S. Application Data (60) Provisional application No. 61/675,736, filed on Jul. 25, 2012.

(51) Int. Cl.
G06N 3/02 (2006.01)

(52) U.S. Cl.
CPC .................................. G06N 3/02 (2013.01)
USPC ........................................................ 706/15

(58) Field of Classification Search
USPC .............................................. 706/15, 44, 62
See application file for complete search history.

(56) References Cited

U.S. PATENT DOCUMENTS

| 6,581,046 B1* | 6/2003 | Ahissar ............................ 706/15 |
| 7,724,168 B1 | 5/2010 | Cruz-Albrecht et al. ..... 341/138 |
| 7,750,835 B1 | 7/2010 | Cruz-Albrecht et al. ..... 341/166 |
| 7,822,698 B1 | 10/2010 | Cruz-Albrecht |
| 8,600,919 B2* | 12/2013 | Poon et al. ....................... 706/33 |
| 2012/0011089 A1 | 1/2012 | Aparin et al. ................... 706/25 |
| 2012/0150781 A1 | 6/2012 | Arthur et al. ................... 706/35 |

OTHER PUBLICATIONS

Jose M. Cruz-Albrecht, et al. "Energy-efficient neuron, synapse and STDP integrated circuits." IEEE Transactions on Miomedical Circuits and Systems, vol. 6, No. 3, pp. 246-256, Jun. 2012.
ISR and WO for related PCT/US2012/065640 mailed on Mar. 28, 2013.
J. Cruz-Albrecht, M. Yung and Srinivasa, "Energy-Efficient Neuron, Synapse and STDP Circuits," IEEE Trans. on Biomedical Circuits and Systems, pp. 246-256, vol. 6, No. 3, Jun. 2012.

(Continued)

Primary Examiner — David Vincent
(74) Attorney, Agent, or Firm — Ladas & Parry (57) ABSTRACT A spike domain asynchronous neuron circuit includes a first spike to exponential circuit for emulating kinetic dynamics at a neuron input and converting voltage spikes into exponentials, a first adjustable gain circuit for emulating homeostatic plasticity coupled to the first voltage-type spike exponential output and having a first current output, a neuron core circuit coupled to the first current output for emulating a neuron core and having a spike encoded voltage output, a filter and comparator circuit coupled to the spike encoded voltage output and having a gain control output coupled to the first adjustable gain circuit for controlling a gain of the first adjustable gain circuit, and an adjustable delay circuit for emulating an axonal delay coupled to the spike encoded voltage output and having an axonal delay output.

23 Claims, 12 Drawing Sheets

(56) References Cited

OTHER PUBLICATIONS

J. Lazzaro, "Low-Power Silicon Spiking Neurons and Axons," *IEEE Symposium on Circuits and Systems*, pp. 2220-2223, 1992.

C. Bartolozzi et al. in "Silicon Synaptic Homoestasis" *Brain Inspired Cognitive Systems*, Oct. 2006.

U.S. Appl. No. 13/151,763, filed Jun. 12, 2011, Cruz-Albrecht.

* cited by examiner

SPIKE DOMAIN NEURON CIRCUIT WITH PROGRAMMABLE KINETIC DYNAMIC, HOMEOSTATIC PLASTICITY AND AXONAL DELAYS

CROSS REFERENCE TO RELATED APPLICATIONS

This application is related to and claims the benefit of U.S. Provisional Application No. 61/675,736, filed Jul. 25, 2012, which is incorporated herein as though set out in full.

STATEMENT REGARDING FEDERAL FUNDING

This invention was made under U.S. Government contract HRL0011-09-C-0001. The U.S. Government has certain rights in this invention.

TECHNICAL FIELD

This disclosure relates to neural processing and in particular to neuron circuits.

BACKGROUND

Figure 1A:
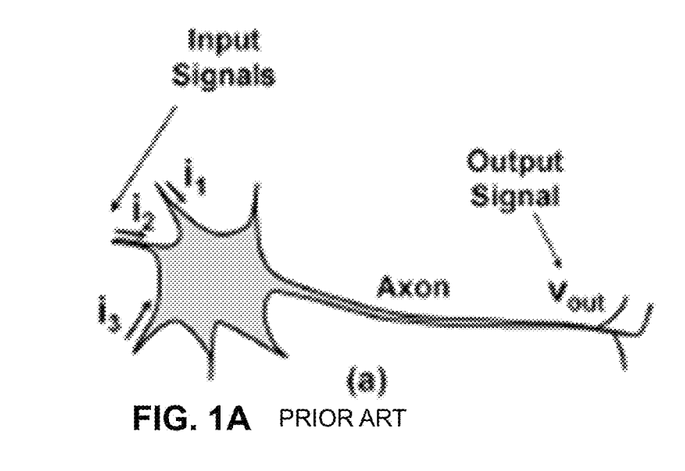
FIG. 1A shows a simplified diagram of a biological neuron and FIG. 1B shows an example of a typical output signal of a neuron in accordance with the prior art.
Figure 1B:
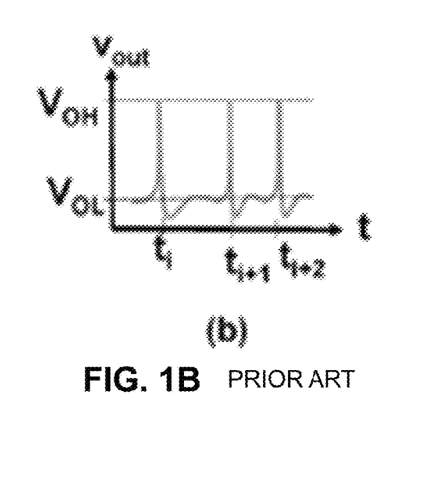

The human brain contains around $10^{11}$ neurons and $10^{15}$ synapses. Neurons, synapses and the networks of them that form the human brain are very complex biological systems. FIG. 1A shows a simplified diagram of a biological neuron. In FIG. 1A, the neuron receives multiple excitatory input current signals ($i_1, i_2, i_3 \ldots$) and produces a single output signal $v_{out}$. FIG. 1B shows an example of a typical output signal. It consists of a stream of spikes, which are pulses of short duration. The output information is encoded into the timing of these spikes ($t_1, t_2 \ldots$).

Figure 1C:
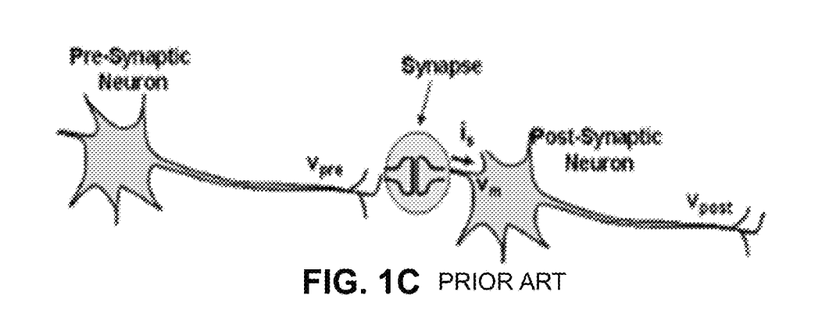
FIG. 1C shows a simplified model of a synapse circuit in accordance with the prior art.

FIG. 1C shows a simplified model of the synapse circuit. The input terminal of the synapse is designated to receive the output voltage signal of a presynaptic neuron. This voltage is called the presynaptic input voltage and is denoted as $v_{pre}$. The output terminal of the synapse is designated to provide a current into the input node of the postsynaptic neuron. This output current of the synapse is denoted as $i_s$.

Neural computers have been used to model the behavior of neurons and synapses and circuits for modeling their behavior have been proposed. In U.S. patent application Ser. No. 13/151,763, filed Jun. 12, 2011, J. Cruz-Albrecht, P. Petre and N. Srinivasa, describe a "High-Order Time Encoded Based Neuron Circuit". The circuit described has many biological mechanisms but does not include the circuits to emulate the features of kinetic dynamics, homeostatic plasticity, and axonal delays.

Kinetic dynamics refer to the signal dynamics associated with the synapses of a neuron. In particular, kinetic dynamics refers to the time evolution of a synapse output response from a spike input. This time response has the shape of an exponential decay. Homeostatic plasticity refers to the capacity of neuron networks to regulate their own excitability relative to neural network activity. This self-regulation operates to evolve the output average spike rate over the long term to a target value. Axonal delays refer to delays in an axon, which typically conduct electrical impulses away from the neuron's cell body. The delay is associated with the time for a spike to be transmitted across an axon. An axon connects a neuron core producing a spike to target synapses that receive delayed versions of that spike.

In U.S. Pat. No. 7,822,698, issued Oct. 26, 2010, J. Cruz-Albrecht and P. Petre describe "Spike Domain and Pulse Domain Non-Linear Processors". The neuron circuits described in U.S. Pat. No. 7,822,698 have a spike domain feature but do not include the circuits to emulate features of kinetic dynamics, homeostatic plasticity, and axonal delays.

J. Cruz-Albrecht, M. Yung and Srinivasa describe another circuit in "Energy-Efficient Neuron, Synapse and STDP Circuits," *IEEE Trans. on Biomedical Circuits and Systems*, pp. 246-256, Vol. 6, No. 3, June 2012. This circuit does describe a neuron core but also does not include any circuitry to provide features for kinetic dynamics, homeostatic plasticity, and axonal delays.

J. Lazzaro describes yet another circuit in "Low-Power Silicon Spiking Neurons and Axons," *IEEE Symposium on Circuits and Systems*, pp. 2220-2223, 1992. This paper describes a circuit for homeostatic plasticity and kinetic dynamics. However a capacitor is required for each input to a synapse associated with a neuron, which can be a very large number of capacitors.

C. Bartolozzi et al. in "Silicon Synaptic Homoestasis" *Brain Inspired Cognitive Systems*, October 2006 describe a circuit with a type of axonal delay. But the circuit requires two capacitors for each delay stage.

What is needed is a circuit that overcomes the disadvantages of the prior art. It would be desirable to reduce the complexity of the circuitry due to the challenge of modeling the human brain, which contains around $10^{11}$ neurons and $10^{15}$ synapses, while more accurately modeling the biological properties of neurons and synapses. The embodiments of the present disclosure answer these and other needs.

SUMMARY

In a first embodiment disclosed herein, a spike domain asynchronous neuron circuit comprises a first spike to exponential circuit for emulating kinetic dynamics at a neuron input and converting voltage spikes into exponentials, the first spike to exponential circuit having a first plurality of voltage-type spike domain inputs and having a first voltage-type spike exponential output, a first adjustable gain circuit for emulating homeostatic plasticity coupled to the first voltage-type spike exponential output and having a first current output, a neuron core circuit coupled to the first current output for emulating a neuron core and having a spike encoded voltage output, a filter and comparator circuit coupled to the spike encoded voltage output and having a gain control output coupled to the first adjustable gain circuit for controlling a gain of the first adjustable gain circuit, and an adjustable delay circuit for emulating an axonal delay coupled to the spike encoded voltage output and having an axonal delay output.

In another embodiment disclosed herein, a method of providing a spike domain asynchronous neuron circuit comprises forming a first spike to exponential circuit for emulating kinetic dynamics at a neuron input and converting voltage spikes into exponentials, the first spike to exponential circuit having a first plurality of voltage-type spike domain inputs and having a first voltage-type spike exponential output, forming a first adjustable gain circuit for emulating homeostatic plasticity coupled to the first voltage-type spike exponential output and having a first current output, forming a neuron core circuit coupled to the first current output for emulating a neuron core and having a spike encoded voltage output, forming a filter and comparator circuit coupled to the spike encoded voltage output and having a gain control output coupled to the first adjustable gain circuit for controlling a gain of the first adjustable gain circuit, and forming an adjustable delay circuit for emulating an axonal delay coupled to the spike encoded voltage output and having an axonal delay output.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 2:
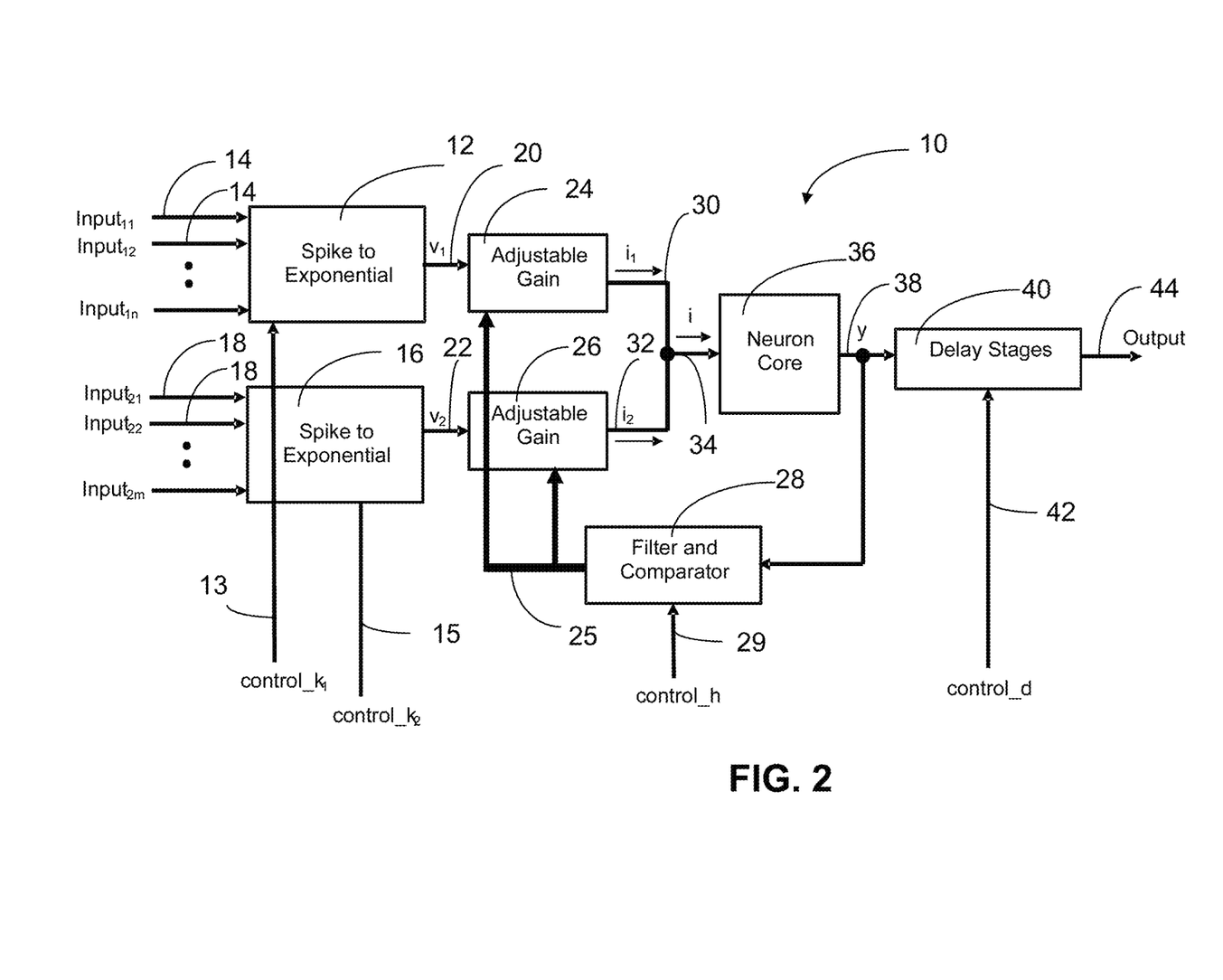
FIG. 2 is a block diagram of an asynchronous spiking neuron electronic circuit with programmable kinetic dynamics, homeostatic plasticity and axonal delays in accordance with the present disclosure.

FIG. 2 shows a block diagram of an asynchronous spiking neuron electronic circuit 10 with programmable kinetic dynamics, homeostatic plasticity and axonal delays in accordance with the present disclosure. The circuit can be used as a basic element to implement large parallel neural electronic systems for processing. The asynchronous spiking neuron electronic circuit 10 requires only a small number of internal capacitors to implement a large number of effects, which allows the circuit 10 to be implemented with relatively low power in a relatively small area. This is important as the number of capacitors can be the limiting factor in the density of networks of neurons implemented in an integrated circuit. In circuit 10, there is only one capacitor for a group of n synapses. For example, in a network with 5000 synapses, the use of circuit 10 can reduce the number of capacitors in a network of neurons and synapses by a factor of 5,000.

Figure 3:
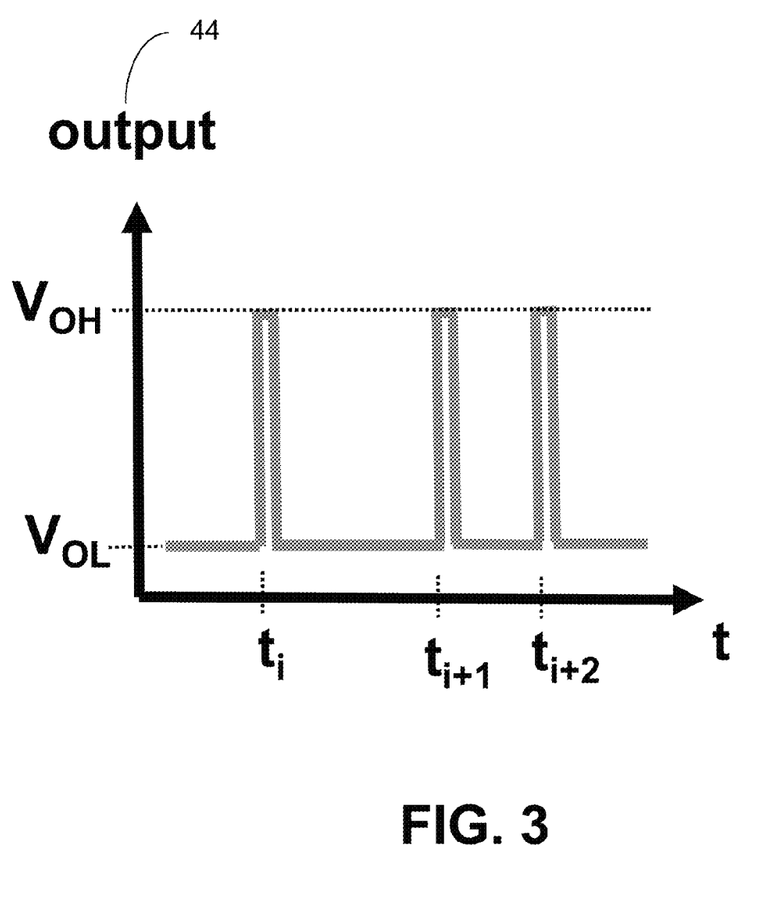
FIG. 3 shows a typical output waveform from the circuit block diagram in FIG. 2 in accordance with the present disclosure.

FIG. 3 shows a typical output waveform 44 from the circuit block diagram 10 in FIG. 2. A neural network has many circuits 10 as shown in FIG. 2. The output 44 of one of the circuits may be connected to one or more of the inputs to another circuit 10, so the inputs 14 and 18 have the same waveform as shown in FIG. 3. In general the interconnectivity between the circuits 10 may be very complex.

The circuit 10 has multiple sets of inputs. The first set of n inputs is labeled as $input_{11}$ to $input_{1n}$ 14. The second set of m inputs is labeled as $input_{21}$ to $input_{2m}$ 18. The number of n inputs and the number of m input may be different. All the inputs are voltage-type spike-domain signals. The circuit 10 has a single output 44 that is also a voltage-type spike domain signal.

All of the signals are asynchronous. The output signals 44, as shown in FIG. 3 have only two possible amplitude values, high and low. The information in the output signals 44 is entirely encoded into the timing of fixed-amplitude asynchronous spikes.

The spike-to-exponential stages 12 and 16 are used to implement programmable kinetic dynamics at the input of a neuron. The adjustable gain elements 24 and 26, connected to the output of the spike to exponential stages 12 and 16, respectively, are controlled by a filter and comparator circuit 28 and implement homeostatic plasticity. Together, the spike to exponential stages 12 and 16 and the adjustable gain elements 24 and 26 are circuits to emulate the behavior of a synapse. The neuron core 36 connected to the sum 34 of the outputs of the adjustable gain elements 24 and 26 and may model an integrate-and-fire neuron. The neuron core 36 converts the current signal, i 34, into a voltage signal, y 38, that is spike encoded. The delay stages 40 are connected to the output of the neuron core 36 and implement axonal delays.

The circuit 10 has various control signals. Control_$k_1$ 13 and control_$k_2$ 15 are used to set internal time constants for the spike to exponential circuits 12 and 16 to implement programmable kinetic dynamics at the input of a neuron. Control_h 29 is used to set a target neuron spike rate for the filter and comparator 28 and adjustable gain circuits 24 and 26 to implement homeostatic plasticity. Control_d is used to set a target delay for the axonal delay circuits 40.

Signals $v_1$ 20 and $v_2$ 22 are voltage outputs of spike to exponential blocks 12 and 16, respectively. Signal $v_1$ is a function of inputs $input_{11}$ to $input_{1n}$ 14, and the signal $v_2$ is a function of inputs $input_{21}$ to $input_{2m}$ 18. Signals $i_1$ 30 and $i_2$ 32 are current outputs of adjustable gain blocks 24 and 26, respectively. They are scaled versions of voltage signals $v_1$ 20 and $v_2$ 22. Signal i 34 is the sum of $i_1$ 30 and $i_2$ 32, and is the input to the neuron core 36. Signal y 38 is the output of the neuron core 36 and is provided as an input to delay stages 40.

Figure 4A:
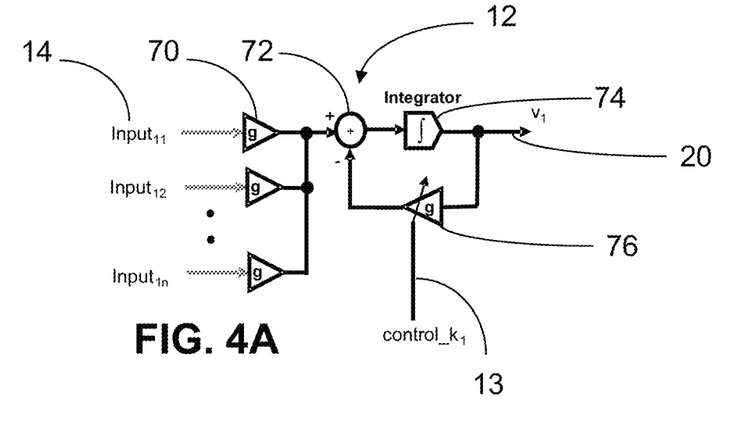
FIG. 4A is a circuit diagram of a spike to exponential block of FIG. 2.

FIG. 4A is a circuit diagram of spike to exponential block 12 of FIG. 2. The spike to exponential circuit 12 has one or more input amplifiers 70, an integrator 74, and a negative feedback including amplifier 76 with a variable gain and summer 72. The integrator 74 may be implemented in an integrated circuit with a capacitor and a variable resistor controlled by a time constant control. The variable gain amplifier 76 may be implemented by a variable resistor.

Figure 4B:
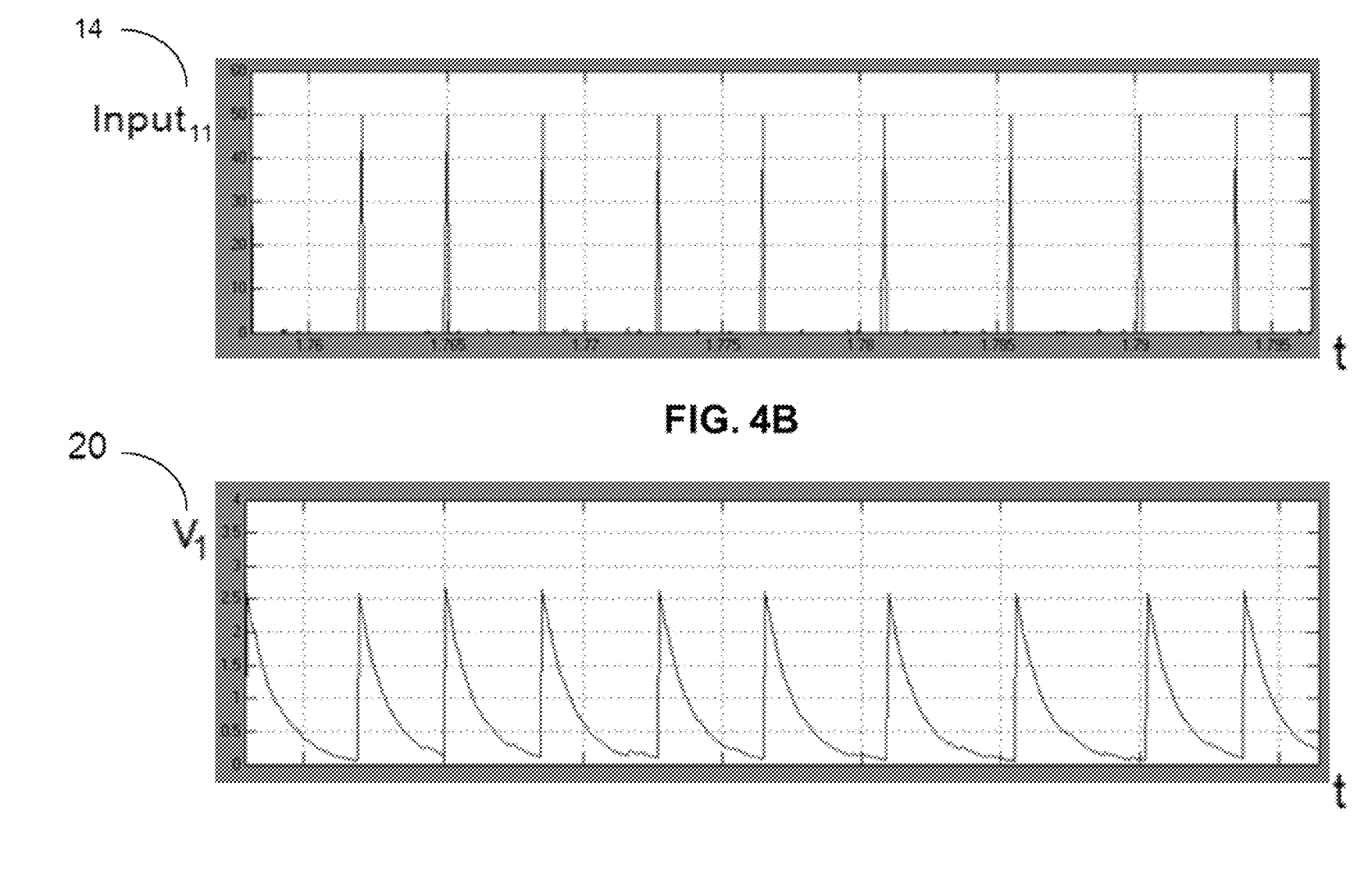
FIG. 4B shows an example of a typical input waveform and an example of a typical output waveform of a spike to exponential block in accordance with the present disclosure.

FIG. 4B shows an example of a typical input waveform 14 and an example of a typical output waveform 20 of the spike to exponential block. The inputs $input_{11}$ to $input_{1n}$ 14 are voltage spike trains, as shown in FIG. 4B. In the simplified simulation example shown on FIG. 4B only one input, namely $input_{11}$, is active and has spikes and only this input is plotted. In general many inputs 14 are active and have spikes. As shown in FIG. 4B the multiple input spikes 14 are converted into outputs 20 that spike to a high level and then exponentially decrease to a low level. The outputs may be referred to as spike exponentials.

Figure 5:
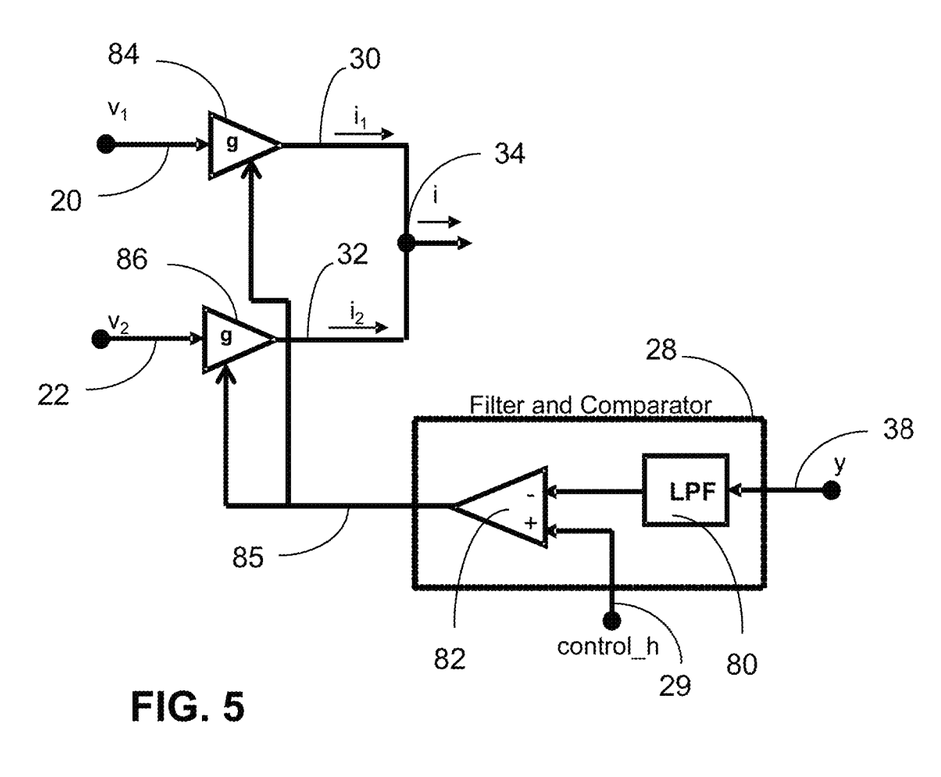
FIG. 5 shows a circuit diagram for the adjustable gain blocks and filter and comparator block of FIG. 2 in accordance with the present disclosure.

FIG. 5 shows a circuit diagram of the adjustable gain blocks 24 and 26 and filter and comparator block 28 of FIG. 2. The adjustable gains 24 and 26 may be implemented by transconductance amplifiers 84 and 86, respectively. The input to transconductance amplifier 84 and 86, is signal v1 20 and v2 22, respectively. The output of the transconductance amplifiers 84 and 86 is current i1 30 and i2 32, respectively. The transconductance gain of the transconductance amplifiers 84 and 86 is g, which may be adjusted by signal 85 at the output of the filter and comparator block 28.

The transconductance amplifier 84 may have internal gating circuitry that can set the output current i1 30 to zero when v1 20 is smaller than a programmable threshold value. Similarly, the transconductance amplifier 86 may have internal gating circuitry that can set the output current i2 32 to zero when v2 22 is smaller than a programmable threshold value.

The filter and comparator block 28 has a low pass filter 80 with an input connected to the output y 38 of neuron core 36. A comparator 82 is connected to the output of the low pass filter 80 and control_h 29 and the output of the comparator is signal 85. The control_h 29 is used to set the desired long term target output spike rate of the complete neuron circuit.

Figure 6A:
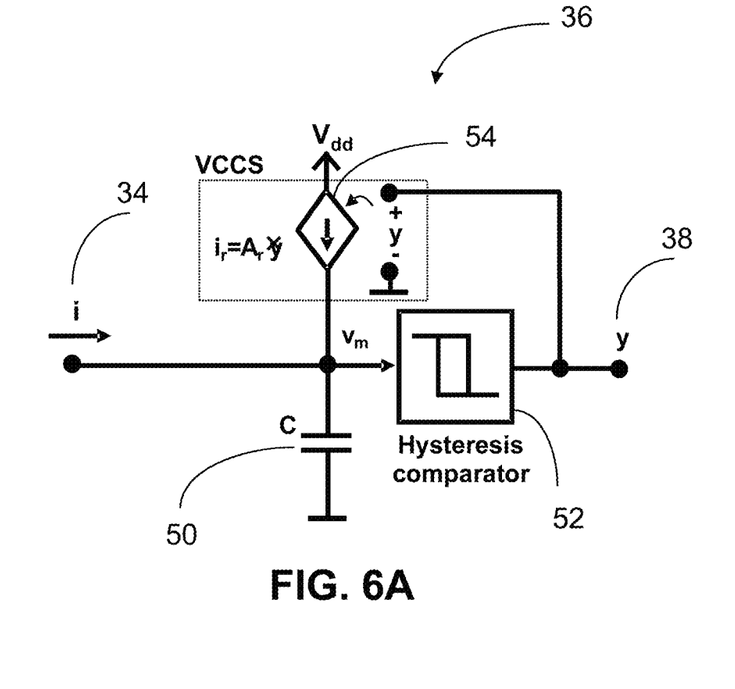
FIG. 6A shows a diagram of a neuron core circuit in accordance with the present disclosure.
Figure 6B:
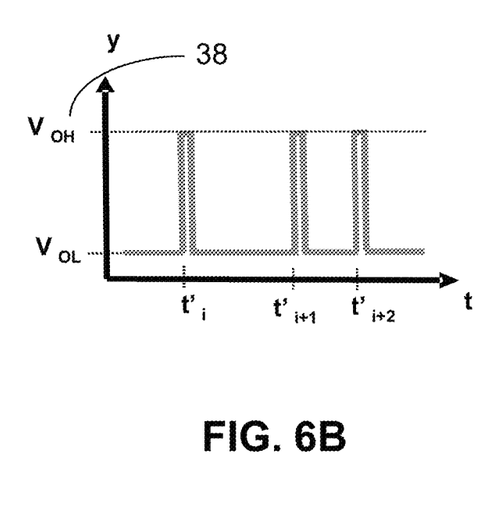
FIG. 6B shows a typical output waveform of the neuron core circuit in accordance with the present disclosure.

FIG. 6A shows a circuit diagram of the neuron core 36 of FIG. 2, which may have a current source 54, a capacitor 50, and a hysteresis comparator 52. FIG. 6B shows a typical output waveform of the output y 38 of the neuron core 36.

Figure 7A:
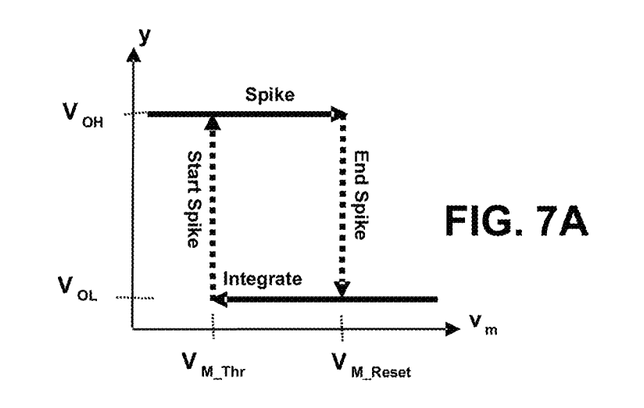
FIG. 7A shows the output-input transfer characteristic of the hysteresis comparator of FIG. 6A.
Figure 7B:
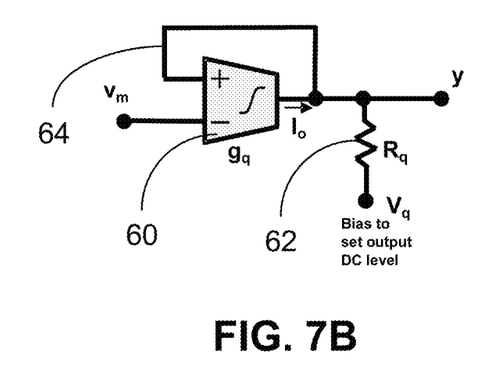
FIG. 7B shows a circuit diagram of the hysteresis comparator.
Figure 7C:
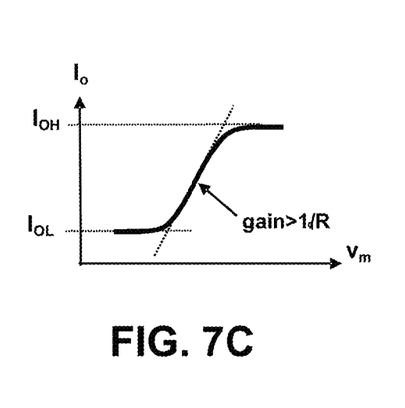
FIG. 7C shows the output-input transfer characteristic of the transconductance amplifier in the hysteresis comparator in accordance with the present disclosure.

FIG. 7A shows the output-input transfer characteristic of the hysteresis comparator 52 of FIG. 6A, showing that when a spike starts the output y is set at a voltage $V_{CH}$ until the end of the spike. Then, the voltage is reset to $V_{OL}$. The start and end of the spike are determined by $V_{M\_Vhr}$ and $V_{M\_Reset}$, respectively. FIG. 7B shows a circuit diagram for an embodiment of the hysteresis comparator 52 having a nonlinear transconductance amplifier 60 with positive feedback 64 and a resistor 62. FIG. 7C shows the output-input transfer characteristic of the transconductance amplifier 60 in the hysteresis comparator 52, showing the gain of the transconductance amplifier 60 to be greater than $1/R_q$ where $R_q$ is the value of the resistor 62.

Figure 8A:
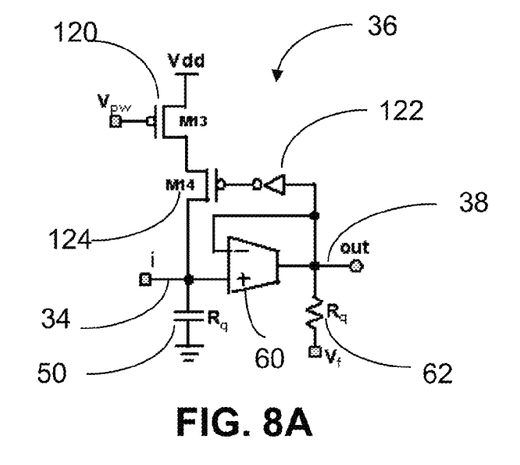
FIG. 8A shows another circuit diagram of the neuron core of FIGS. 2 and 6A in accordance with the present disclosure.
Figure 8B:
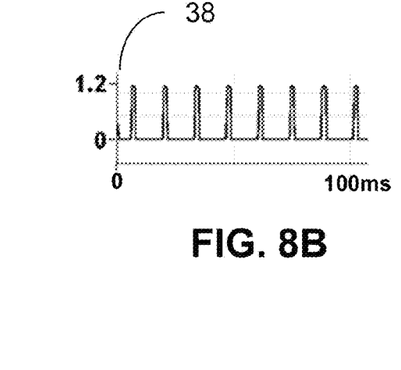
FIG. 8B shows a typical output waveform of the circuit of FIG. 8A in accordance with the present disclosure.

FIG. 8A shows one embodiment of a circuit diagram for the neuron core 36 of FIGS. 2 and 6A. The circuit of FIG. 8A implements the neuron core with one capacitor 50, a hysteresis comparator 52, and a voltage controlled current source 54. As shown in FIG. 8A the voltage controlled current source 54 can be implemented with two field effect transistors 120 and 124 in series, with field effect transistor 120 having its gate connected to a set voltage $V_{pw}$ and field effect transistor 124 having its gate connected to an output of an inverter 122, which has its input connected to the output of the hysteresis comparator 60. FIG. 8B shows a typical output waveform for a transistor level simulation for the output 38 of the neuron core circuit of FIG. 8A for the case of a direct current (DC) at input 34. The circuit consumes a very low energy of about 0.4 pJ per spike and the output y 38 is a voltage spike train.

Figure 8C:
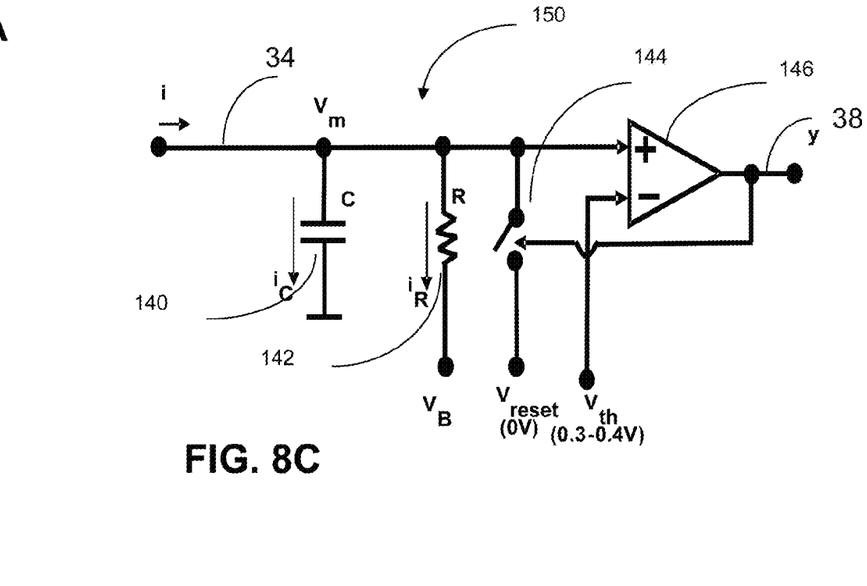
FIG. 8C shows another embodiment of a circuit diagram of a neuron core of FIG. 2 in accordance with the present disclosure.

FIG. 8C shows an alternate embodiment of a circuit 150 for implementing a neuron core 36 of FIG. 2 in accordance with the present disclosure. This embodiment is an integrate and fire neuron and implements the equation below.

$$C\frac{dv_m}{dt} = i - \frac{v_m}{R} + \frac{V_B}{R}$$

The circuit 150 has only one capacitor 140, a resistor 142, a switch 144 and a comparator 146. The output 38 controls the switch 144 to either be open or to connect a positive input of the comparator 146 to $V_{reset}$. The negative input of the comparator 146 is connected to $V_{th}$, which implements a threshold. When the capacitor 140 is charged above $V_{th}$ the y 38 output controls the switch 144 to close thereby discharging the capacitor 140, whereupon the y 38 output controls the switch to open, thereby repeating the process.

Figures 9A, 9B:
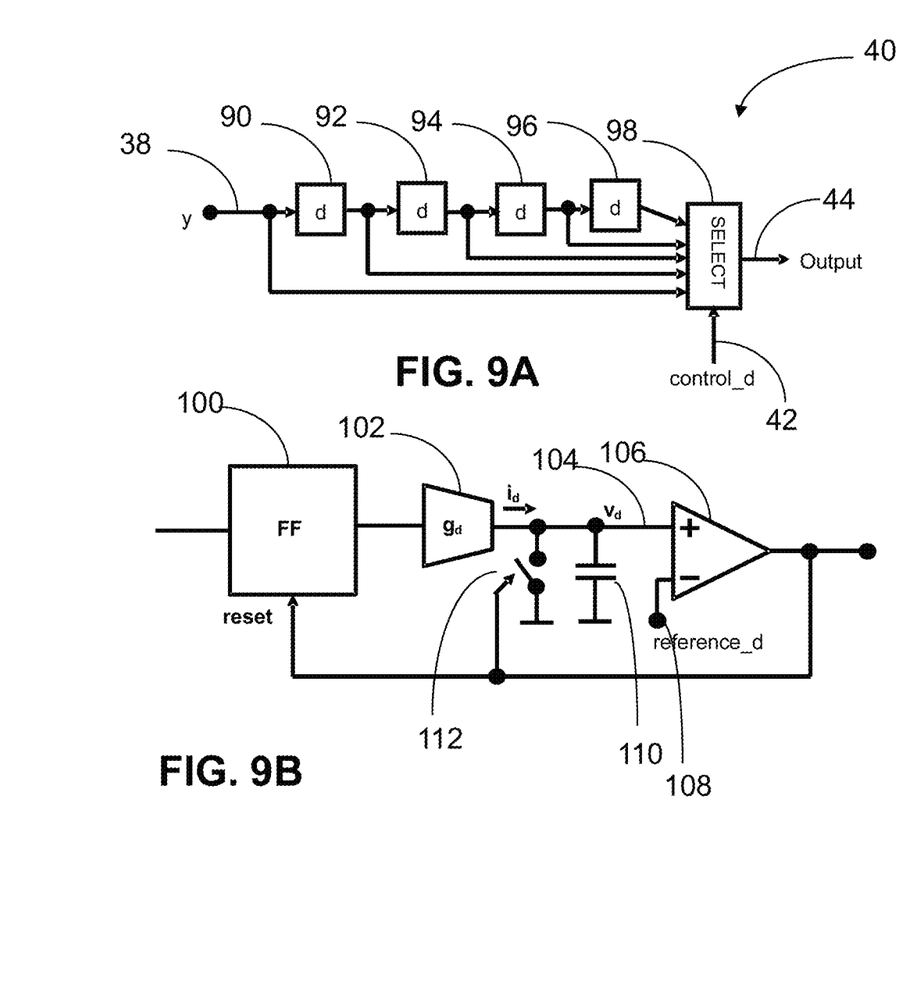
FIG. 9A shows a circuit for the delay stages block of FIG. 2.
FIG. 9B shows a circuit diagram of one delay stage of the delay stages block in accordance with the present disclosure.

FIG. 9A shows a circuit for the delay stages block 40 of FIG. 2, which has as an input, y 38, a series of delay stages 90, 92, 94, and 96, and a selector 98. The selector 98 is controlled by control_d 42 and selects the output y 38, the output of delay stage 90, the output of delay stage 92, the output of delay stage 94, or the output of delay stage 96. So, control_d, which is a digital control, selects between no delay or 4 possible delay values. The output of the selector 98 is the output of the asynchronous spiking neuron electronic circuit 10 with programmable kinetic dynamics, homeostatic plasticity and axonal delays.

FIG. 9B shows a circuit diagram of one of the delay stages in accordance with the present disclosure. Each delay stage may have a flip flop 100, a transconductance amplifier 102, a capacitor 110, and a comparator 106. During operation a current id charges capacitor 110 until vd 104 reaches a reference value, reference_d 108. The reference_d 108 can be used as an analog control. When the capacitor is charged to the level of reference_d 108, the switch 112 is closed and the capacitor 110 is discharged and the flip flop is reset to again let an input voltage charge the capacitor 110 and the switch 112 is opened.

In an integrated circuit implementation, a delay stage may be implemented in a differential circuit. One embodiment of a differential circuit uses two flip-flops, two amplifiers, two capacitors and one differential comparator.

Figure 10:
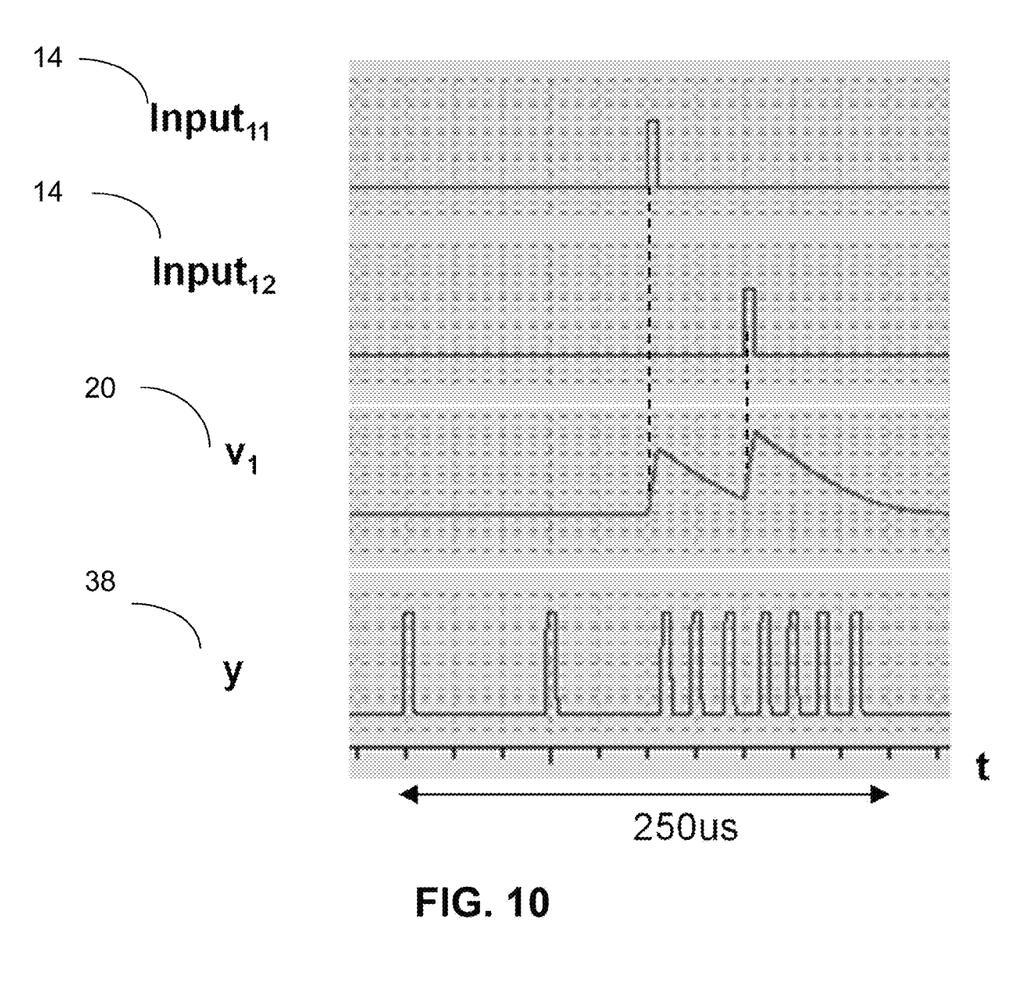
FIG. 10 shows a simulation of typical waveforms for the inputs and output of the spike to exponential blocks of FIG. 2, and the output of the neuron core of FIG. 2 in accordance with the present disclosure.

FIG. 10 shows a simulation of typical waveforms for the circuit 10, showing the inputs 14 and output 20 of the spike to exponential block 12 of FIG. 2 and the output y 38 of the neuron core 36 of FIG. 2. As shown in FIG. 10 the multiple input spikes are converted into exponentials as desired.

Figure 11:
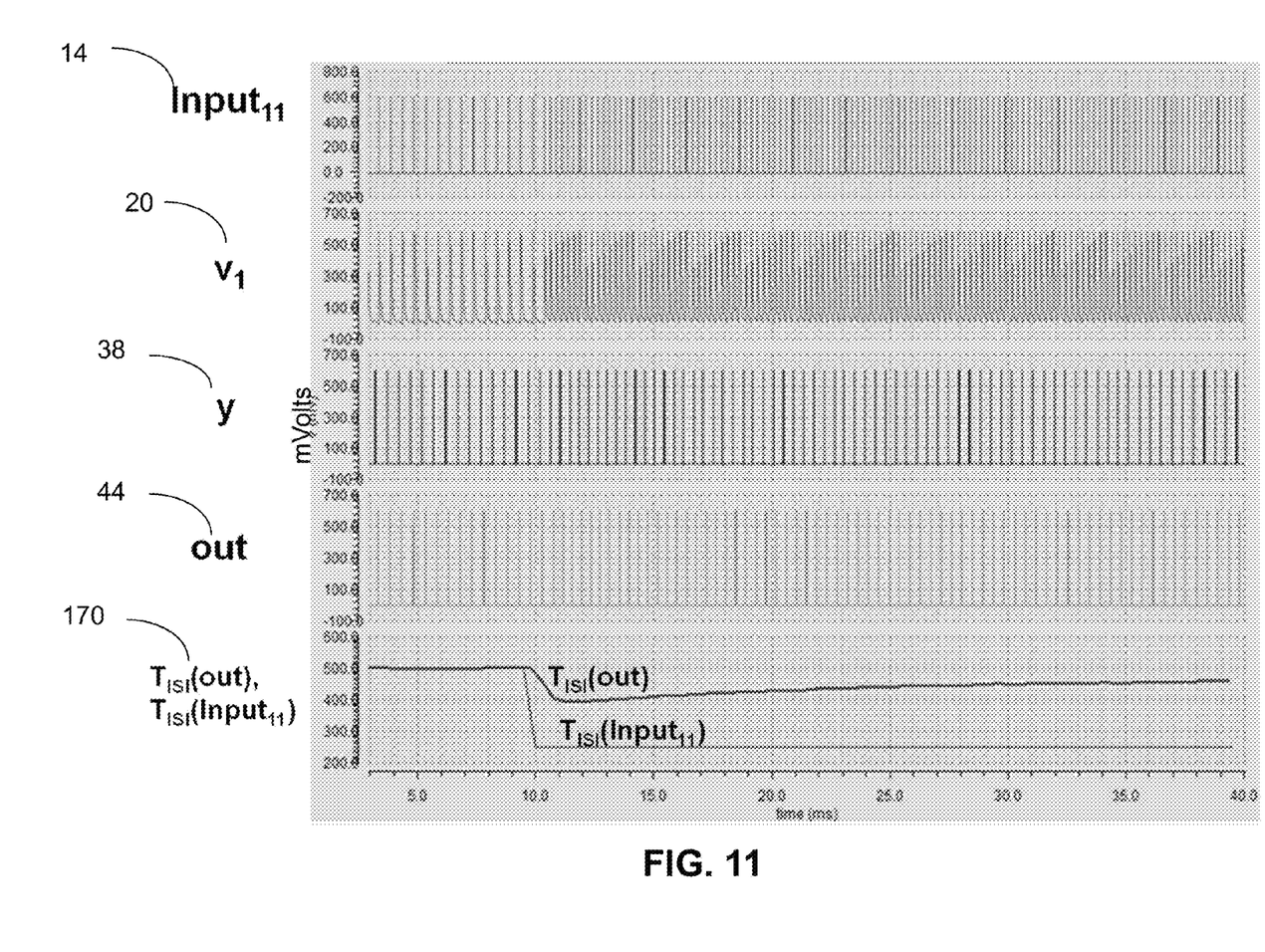
FIG. 11 shows a simulation of typical waveforms for the inputs and output of the spike to exponential blocks of FIG. 2, the output of the neuron core of FIG. 2, the output of the delay stages block of FIG. 2, and the $T_{ISI}$ (inter spike interval) of the input to the spike to exponential blocks and the $T_{ISI}$ of the output of the delay stages block in accordance with the present disclosure.

FIG. 11 shows a simulation of typical waveforms for the circuit 10, showing the inputs 14 and output 20 of the spike to exponential block 12 of FIG. 2, the output y 38 of the neuron core 36 of FIG. 2, and the output 44 of the delay stages block 40 of FIG. 2. The $T_{ISI}$ (inter spike interval) of the input 14 to the spike to exponential block 12 and the $T_{ISI}$ of the output 44 of the delay stages block 40 is also shown. The input 14 is converted into a signal $V_1$ 20 with a train of exponentials as desired. The output y 38 of the neuron core 36 is a spike train as desired. In this simulation example, at time 10 ms the activity of the input signal 14 suddenly increases, as the input spike frequency increases and the inter spike period decreases. At time t=10 ms the spike rate of neuron core output y 48 also increases as desired. The final output 44 is a delayed version of output y 38, as desired.

The bottom graph 170 of FIG. 11 shows the $T_{ISI}$ of the input 14 and output 44. In this simulation example the $T_{ISI}$ of the input 14 decreases abruptly at time t=10 ms. At time t=10 ms the $T_{ISI}$ of the output 44 also decreases as desired. After that the $T_{ISI}$ slowly increases, which is also as desired. This is performed by the circuits of FIG. 5 that restore the spike rate of the neuron to a long-term target value.

A method of providing a spike domain asynchronous neuron circuit can include the steps of forming a first spike to exponential circuit for emulating kinetic dynamics at a neuron input and converting voltage spikes into exponentials, the first spike to exponential circuit having a first plurality of voltage-type spike domain inputs and having a first voltage-type spike exponential output, forming a first adjustable gain circuit for emulating homeostatic plasticity coupled to the first voltage-type spike exponential output and having a first current output, forming a neuron core circuit coupled to the first current output for emulating a neuron core and having a spike encoded voltage output, forming a filter and comparator circuit coupled to the spike encoded voltage output and having a gain control output coupled to the first adjustable gain circuit for controlling a gain of the first adjustable gain circuit, and forming an adjustable delay circuit for emulating an axonal delay coupled to the spike encoded voltage output and having an axonal delay output.

The method can further include forming a second spike to exponential circuit for emulating kinetic dynamics at a neuron input and converting voltage spikes into exponentials, the second spike to exponential circuit having a second plurality of voltage-type spike domain inputs and having a second voltage-type spike exponential output, and forming a second adjustable gain circuit for emulating homeostatic plasticity coupled to the second voltage-type spike exponential output and having a second current output. The gain control output is coupled to the second adjustable gain circuit for controlling the gain of the second adjustable gain circuit, the first current output is added to the second current output to form a summed current output, and the neuron core is coupled to the summed current output.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . . "

What is claimed is:

1. A spike domain asynchronous neuron circuit comprising:
    a first spike to exponential circuit for emulating kinetic dynamics at a neuron input and converting voltage spikes into exponentials, the first spike to exponential circuit having a first plurality of voltage-type spike domain inputs and having a first voltage-type spike exponential output;
    a first adjustable gain circuit for emulating homeostatic plasticity coupled to the first voltage-type spike exponential output and having a first current output;
    a neuron core circuit coupled to the first current output for emulating a neuron core and having a spike encoded voltage output;
    a filter and comparator circuit coupled to the spike encoded voltage output and having a gain control output coupled to the first adjustable gain circuit for controlling a gain of the first adjustable gain circuit; and
    an adjustable delay circuit for emulating an axonal delay coupled to the spike encoded voltage output and having an axonal delay output.

2. The circuit of claim 1 further comprising:
    a second spike to exponential circuit for emulating kinetic dynamics at a neuron input and converting voltage spikes into exponentials, the second spike to exponential circuit having a second plurality of voltage-type spike domain inputs and having a second voltage-type spike exponential output; and
    a second adjustable gain circuit for emulating homeostatic plasticity coupled to the second voltage-type spike exponential output and having a second current output;
    wherein the gain control output is coupled to the second adjustable gain circuit for controlling the gain of the second adjustable gain circuit;
    wherein the first current output is added to the second current output to form a summed current output; and
    wherein the neuron core is coupled to the summed current output.

3. The circuit of claim 2 further comprising:
    a first time constant control coupled to the first spike to exponential circuit for adjusting the kinetic dynamics of the first spike to exponential circuit;
    a second time constant control coupled to the second spike to exponential circuit for adjusting the kinetic dynamics of the second spike to exponential circuit;
    a neuron spike rate control coupled to the filter and comparator circuit for setting a target neuron spike rate; and
    a delay control coupled to the adjustable delay circuit for setting a target axonal delay.

4. The circuit of claim 2 wherein:
the first voltage-type spike exponential output and the second voltage-type spike exponential output each have voltage signals that spike to a high level and then exponentially decrease to a low level.

5. The circuit of claim 1 wherein:
the axonal delay output comprises a voltage-type spike domain signal alternating between a high and a low amplitude value;
wherein information in the voltage-type spike domain signal is encoded in timing of the signal.

6. The circuit of claim 2 wherein the first spike to exponential circuit and the second spike to exponential circuit each comprise:
a plurality of amplifiers, each amplifier coupled to one of the plurality of respective first or second voltage-type spike domain inputs; and
an integrator coupled to an output of each amplifier.

7. The circuit of claim 6 wherein the integrator comprises an integrator having a negative feedback having variable gain controlled by a respective first or second time constant control.

8. The circuit of claim 6 wherein the integrator comprises:
a capacitor; and
a variable resistor controlled by a respective first or second time constant control.

9. The circuit of claim 2 wherein:
the first adjustable gain circuit comprises a first transconductance amplifier having a gain controlled by the gain control output; and
the second adjustable gain circuit comprises a second transconductance amplifier having a gain controlled by the gain control output.

10. The circuit of claim 2 wherein the filter and comparator circuit comprises:
a low pass filter coupled to the spike encoded voltage output of the neuron core circuit; and
a comparator with one input coupled to the low pass filter and another input coupled to a neuron spike rate control for setting a target neuron spike rate;
wherein the comparator output is the gain control output coupled to the first adjustable gain circuit for controlling the gain of the first adjustable gain circuit and coupled to the second adjustable gain circuit for controlling the gain of the second adjustable gain circuit.

11. The circuit of claim 2 wherein the neuron core circuit comprises:
a voltage controlled current source;
a capacitor; and
a hysteresis comparator, wherein an input to the hysteresis comparator, an output of the voltage controlled current source, and the capacitor are coupled to the summed current output; and
wherein the voltage controlled current source is controlled by an output of the hysteresis comparator.

12. The circuit of claim 11 wherein the hysteresis comparator comprises:
a nonlinear transconductance amplifier with positive feedback; and
a resistor.

13. The circuit of claim 12 wherein the voltage controlled current source comprises:
a first transistor coupled to a voltage source;
a second transistor coupled to the first transistor; and
an inverter coupled to an output of the transconductance amplifier and to the second transistor.

14. The circuit of claim 1 wherein the neuron core circuit comprises:
a capacitor;
a resistor in parallel with the capacitor;
a switch; and
a comparator having a positive input connected to the capacitor, the resistor, and the switch, having a negative input connected to a $V_{th}$ voltage, and having an output;
wherein the output controls the switch to either be open or to close to connect the positive input of the comparator to a $V_{reset}$ voltage; and
wherein when the capacitor is charged above $V_{th}$ the output controls the switch to close thereby discharging the capacitor, whereupon the output controls the switch to open, thereby repeating the process.

15. The circuit of claim 1 wherein the neuron core circuit is an integrate and fire neuron and implements the equation $$C\frac{dv_m}{dt} = i - \frac{v_m}{R} + \frac{V_B}{R}.$$

16. The circuit of claim 1 wherein the adjustable delay circuit comprises:
a plurality of delay stages connected in series;
a selector having the axonal delay output;
a control coupled to the selector;
wherein the control selects between the axonal delay output, or an output of any one of the plurality of delay stages.

17. The circuit of claim 16 wherein a delay stage comprises:
a flip flop;
a transconductance amplifier coupled to the flip flop;
a capacitor coupled to the transconductance amplifier;
a comparator coupled to the capacitor and a reference voltage; and
a switch;
wherein when a voltage on the capacitor reaches the reference voltage the switch is closed and the capacitor is discharged and the flip flop is reset to again let an input voltage charge the capacitor and the switch is opened.

18. The circuit of claim 1 wherein the adjustable delay circuit comprises:
a differential circuit comprising two flip-flops, two amplifiers, two capacitors and one differential comparator.

19. A method of providing a spike domain asynchronous neuron circuit comprising:
forming a first spike to exponential circuit for emulating kinetic dynamics at a neuron input and converting voltage spikes into exponentials, the first spike to exponential circuit having a first plurality of voltage-type spike domain inputs and having a first voltage-type spike exponential output;
forming a first adjustable gain circuit for emulating homeostatic plasticity coupled to the first voltage-type spike exponential output and having a first current output;
forming a neuron core circuit coupled to the first current output for emulating a neuron core and having a spike encoded voltage output;
forming a filter and comparator circuit coupled to the spike encoded voltage output and having a gain control output coupled to the first adjustable gain circuit for controlling a gain of the first adjustable gain circuit; and
forming an adjustable delay circuit for emulating an axonal delay coupled to the spike encoded voltage output and having an axonal delay output.

20. The method of claim 19 further comprising:
forming a second spike to exponential circuit for emulating kinetic dynamics at a neuron input and converting voltage spikes into exponentials, the second spike to exponential circuit having a second plurality of voltage-type spike domain inputs and having a second voltage-type spike exponential output; and forming a second adjustable gain circuit for emulating homeostatic plasticity coupled to the second voltage-type spike exponential output and having a second current output;

wherein the gain control output is coupled to the second adjustable gain circuit for controlling the gain of the second adjustable gain circuit;

wherein the first current output is added to the second current output to form a summed current output; and wherein the neuron core is coupled to the summed current output.

21. The method of claim 20 further comprising:

providing a first time constant control coupled to the first spike to exponential circuit for adjusting the kinetic dynamics of the first spike to exponential circuit;

providing a second time constant control coupled to the second spike to exponential circuit for adjusting the kinetic dynamics of the second spike to exponential circuit;

providing a neuron spike rate control coupled to the filter and comparator circuit for setting a target neuron spike rate; and providing a delay control coupled to the adjustable delay circuit for setting a target axonal delay.

22. The method of claim 20 wherein:

the first voltage-type spike exponential output and the second voltage-type spike exponential output each have voltage signals that spike to a high level and then exponentially decrease to a low level.

23. The method of claim 19 wherein:

the axonal delay output comprises a voltage-type spike domain signal alternating between a high and a low amplitude value;

wherein information in the voltage-type spike domain signal is encoded in timing of the signal.

* * * * *